Patented Apr. 28, 1936

2,038,566

UNITED STATES PATENT OFFICE 2,038,566

PRODUCTION OF HYDROGEN AND PREPARATION OF CATALYSTS THEREFOR

Rudolf Huettner, Oppau, and Gustav Wietzel, Mannheim, Germany, assignors to I. G. Farbenindustrie Aktiengesellschaft, Frankfort-on-the-Main, Germany No Drawing. Application January 11, 1932, Serial No. 586,067. In Germany January 17, 1931

7 Claims. (Cl. 23—212)

The present invention relates to improvements in the production of hydrogen and in the preparation of catalysts therefor.

It has already been proposed to prepare mixtures of hydrogen and carbon monoxide, or of hydrogen, carbon monoxide and nitrogen by the catalytic conversion at high temperatures of hydrocarbons with gases capable of converting carbon into carbon monoxide such as oxygen, air, steam or carbon dioxide. When carrying out these reactions it is advantageous to employ very active catalysts, as for example those which contain nickel and aluminium oxide or nickel, kaolin and magnesium oxide. If these be employed, however, for the decomposition of saturated or unsaturated gaseous or vaporous hydrocarbons having a higher molecular weight than methane or gases containing the same there is a tendency for the hydrocarbons in part not to be converted in the desired sense, but to be converted into free carbon and hydrogen. Gaseous and vaporous hydrocarbons are hereinafter referred to as "vaporized hydrocarbons". The separated carbon remains between the pieces of catalyst and clogs the reaction chamber within a short period of time so that the operation has to be interrupted and the catalyst regenerated or renewed.

We have now found that in the abovesaid conversion of vaporized saturated or unsaturated hydrocarbons having a higher molecular weight than methane the said objection does not occur when catalysts are employed which are obtained by preparing an aqueous paste containing one or more metals of the iron group or their oxides, hydroxides or carbonates and a hydraulic binding agent, and allowing the resulting paste to set. Water or aqueous solutions of the said compounds of metals of the iron group, as for example an ammoniacal solution of nickel carbonate, may be employed as the aqueous media for the preparation of the said pastes. With the aid of catalysts prepared in the said manner, which are not inferior to those hitherto known as regards their catalytic activity, mechanical strength and the like, but superior as regards their working life, it is possible to carry on the conversion of hydrocarbons for a long period of time without interruption, and this is of great importance for carrying out the process in practice.

The catalyst substances may be combined with any required amount of binding agent. It is however preferable to employ mixtures of catalysts and hydraulic binding agents containing from 20 to 90 per cent of binding agent.

The metals of the iron group or their compounds may preferably be activated by the addition of suitable compounds, especially by the addition of difficultly reducible oxides of metals of the 2nd to the 6th groups of the periodic system, as for example the oxides of aluminium, magnesium, calcium, uranium, chromium, molybdenum, vanadium, thorium, cerium and the like. By difficultly "reducible oxides" we understand those oxides which are not reduced by hydrogen at temperatures below 1000° C. For example the oxides of nickel and aluminium, or of nickel, aluminium and magnesium may be mixed, the mixture worked up into a paste with water, salt solutions or acids, the paste dried and mixed with the hydraulic binding agent after appropriate comminution. Alternatively, the salts of metals of the iron group may be precipitated as hydroxides from a solution which also contains salts of the activating elements. It is preferable to employ ammonia for this precipitation in order to obtain the precipitate entirely free from alkalies, because it has been found that these effect the deposition of carbon black especially readily. However, good results may also be obtained when the precipitates obtained by precipitation with alkalies, such as soda, are sufficiently washed out until no traces of alkalies can be found in the washing water. The mixture of hydroxides obtained by precipitation may be first roasted to form oxides, the latter then being mixed with the hydraulic binding agents. The ratio of the amounts of substances comprising a metal of the iron group to the amount of activating addition may be varied within wide ranges. For example to each molecular proportion of nickel from 0.1 to 10 molecular proportions of activator, such as aluminium oxide may be employed. Of particular advantage are catalysts containing equal molecular proportions of iron metal and activating substance. As, however, the more usual activating substances such as magnesia, alumina and bauxite are cheaper than nickel, they are used at the same time as carrier substances and therefore employed in larger amounts.

As hydraulic binding agents, those are employed for example which contain about 10 per cent or more of alkaline earth metal oxide or magnesium oxide, preferably commercial cements. Alumina cements have proved to be very suitable for the said purpose. Also Portland cement or iron Portland cement or blast furnace cements or also hydraulic cements of natural origin may be employed with advantage. Similarly, excellent catalysts are obtained when aluminates having hydraulic binding properties, as for example alkaline earth or heavy metal aluminates are used as such or in admixture, as for example calcium aluminates having the formulae $CaO.3Al_2O_3$, $CaO.2Al_2O_3$, $2CaO.3Al_2O_3$ or mixtures thereof, or aluminates of magnesium, iron, nickel and aluminates containing several elements as the basic components of the molecule, as for example

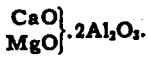

The mixing of the activating substances with the hydraulic binding agents and the making into a paste of the mixture with water may be effected consecutively or simultaneously. In many cases the activation, mixing and making into a paste may be carried out simultaneously.

By varying the ratio of activating substance to hydraulic binding agent and by suitable selection of the two components, the properties, as for example the catalytic activity, of the catalysts may be adapted to any desired purpose. Thus for example catalysts of different catalytic activity may be arranged in one reaction vessel in such a manner that the hydrocarbons to be converted successively pass through several layers of catalysts of gradually increasing activity whereby it is ensured that even the last traces of hydrocarbons present in the gases passed through the first layer or layers are converted in the last layer of catalyst of highest activity.

The process according to the present invention may be effected at temperatures between 400° and 1000° C.; it is preferable to work at between 600° and 800° C. and more particularly between 700° and 750° C.

Ordinary or elevated pressures may be employed. It is, however, preferable to work at ordinary pressure, since by superatmospheric pressures, for example of 20 atmospheres, the tendency of the formation of hydrogen is reduced. At elevated pressures, temperatures near the upper limit of the aforesaid temperature range are employed. As initial materials mainly coming into question may be mentioned waste gases from the destructive hydrogenation of coals, tars and mineral oils, gases issuing from the dry distillation of solid carbonaceous materials, such as coal gas or low-temperature carbonization gases, or fractions of all of these gases, as are obtained for example in the fractionation at low temperatures, or other industrial or natural gases containing gaseous hydrocarbons having a higher molecular weight than methane.

In many cases, as for example when working with steam or carbon dioxide, it is preferable to employ long reaction chambers of material stable to temperature since with such chambers the heat necessary for bringing about the reaction may be easily supplied from outside.

The following examples will further illustrate the nature of this invention but the invention is not restricted to these examples. The parts, where mentioned, are by weight.

*Example 1*

58 kilograms of nickel nitrate and 70 kilograms of aluminium nitrate are dissolved in 3000 liters of water and precipitated at 70° C. with 10 per cent aqueous ammonia. The precipitate is filtered off, washed with water, dried and roasted at about 300° C. 1 part of the resulting mixture of oxides is mixed with 2 parts of alumina cement having the approximate composition: 40 per cent of CaO, 40 per cent of $Al_2O_3$, 16 per cent of $SiO_2$ and 4 per cent of the oxides of iron, titanium and the like, the mixture made into a paste with water, spread out on sheets and cut into pieces of suitable size. In order that they may set completely they are preferably allowed to lie in the air while moistening them frequently.

Instead of the mixture of oxides, the mixture of hydroxides may be used in the same way. Similarly nickel may be replaced by cobalt.

A mixture of 1 part of a gas having the composition: 75 per cent of saturated hydrocarbons having an average formula $C_{1.9}H_{5.8}$, 12 per cent of unsaturated hydrocarbons, 8 per cent of hydrogen and 5 per cent of nitrogen with from 4 to 5 parts of steam is led over the above described catalyst which is situated in a tube heated externally to temperatures of about 700° C. with oxidizing flame gases. The effluent gas has the composition: 10 per cent of carbon dioxide, 71 per cent of hydrogen, 13 per cent of carbon monoxide, 4 per cent of hydrocarbons and 2 per cent of nitrogen. No injurious deposition of carbon black takes place even after long periods of time. The activity of the catalysts employed is practically unaltered even after working for about 2 months.

*Example 2*

29.1 kilograms of nickel nitrate, 35.2 kilograms of aluminium nitrate and 19.1 kilograms of magnesium nitrate are dissolved in 2000 liters of water and precipitated as described in Example 1. The resulting mixture of hydroxides is converted into oxides and 1 part thereof is mixed with 3 parts of the alumina cement specified in Example 1 and further worked up as described in Example 1.

A gas mixture consisting of 25 per cent of ethane, 60 per cent of propane, 9 per cent of butane and 6 per cent of unsaturated hydrocarbons having an average formula $C_{3.5}H_7$ is passed at from 650° to 700° C. together with seven times its volume of steam over the thus prepared catalyst; the velocity of flow may amount to about 1000 volumes of gas per volume of catalyst per hour. The resulting gas consists of 10 per cent of carbon dioxide, 15 per cent of carbon monoxide, 72 per cent of hydrogen and 3 per cent of hydrocarbons. Even after working for several months no deposition of carbon on the catalyst or a decrease in the activity of the latter can be observed.

*Example 3*

1 part of the mixture of oxides prepared as described in Example 1 is mixed with 2 parts of a calcium aluminate having the formula $2CaO.3Al_2O_3$ and the mixture is further treated as described in Example 1. Similar results as described in Example 1 are obtained with this catalyst.

*Example 4*

284 kilograms of a cement having the composition: 10 per cent of CaO, 10 per cent of MgO, 14 per cent of $Al_2O_3$, 12 per cent of $Fe_2O_3$, 47 per cent of $SiO_2$ and 7 per cent of $TiO_2$, $P_2O_5$, and the like are mixed with 64 kilograms of aluminium oxide, 32 kilograms of magnesium oxide and 28 kilograms of nickel oxide, and the mixture is further treated as described in Example 1 after having been made into a paste with water.

Over each volume of the catalyst thus obtained 650 volumes of a gas consisting of 10 per cent of ethylene and 90 per cent of methane are passed per hour together with 3000 volumes of steam. The gas leaving the catalyst space is free from ethylene; in addition to hydrogen, carbon dioxide and carbon monoxide it contains about from 10 to 15 per cent of methane. Deposition of carbon does not occur even after working for long periods of time.

Example 5

75 kilograms of nickel nitrate are dissolved in water and then precipitated by means of an aqueous soda solution; the precipitated basic nickel carbonate is filtered off, washed out and worked up with 30 kilograms of kaolin into a paste which is spread out on plates and then dried. After drying the pieces obtained are heated for some hours to 450° C. and then ground to powder. The resulting powder is mixed with 30 kilograms of the alumina cement specified in Example 1, made up into a paste with water, shaped and allowed to set. Also with this catalyst no deposition of carbon is observed even after long time when employing it for the conversion, by means of steam, of a gas having the composition specified in Example 1.

The abovementioned catalyst powder may be shaped for example by moistening it with water and bringing it into the shape of Raschig rings by compression.

What we claim is:—

1. A process for the production of hydrogen from a vaporized hydrocarbon having a higher molecular weight than methane which comprises bringing said hydrocarbon into interaction with a gas capable of converting carbon into carbon monoxide, at a temperature between 400° and 1000° C. and in the presence of a catalyst consisting of a composition in which a material comprising at least one substance selected from the class consisting of the metals of the iron group, their oxides, hydroxides and carbonates, is thoroughly distributed in a set hydraulic cement.

2. A process for the production of hydrogen from a vaporized hydrocarbon having a higher molecular weight than methane which comprises bringing said hydrocarbon into interaction with steam, at a temperature between 400° and 1000° C. and in the presence of a catalyst consisting of a composition in which a material comprising nickel present in at least one of the forms of metal, oxide, hydroxide and carbonate, is thoroughly distributed in a set hydraulic cement.

3. A process for the production of hydrogen from a vaporized hydrocarbon having a higher molecular weight than methane which comprises bringing said hydrocarbon into interaction with a gas capable of converting carbon into carbon monoxide, at a temperature between 400° and 1000° C. and in the presence of a catalyst consisting of a composition in which a material comprising nickel present in at least one of the forms of metal, oxide, hydroxide and carbonate, together with a difficultly reducible oxide of a metal selected from groups 2 to 6 of the periodic system is thoroughly distributed in a set hydraulic cement.

4. A process for the production of hydrogen from a vaporized hydrocarbon having a higher molecular weight than methane which comprises bringing said hydrocarbon into interaction with a gas capable of converting carbon into carbon monoxide, at a temperature between 400° and 1000° C. and in the presence of a catalyst consisting of a composition in which a mixture of the hydroxides precipitated by means of ammonia from a solution of nickel, and of a metal selected from groups 2 to 6 of the periodic system, the oxide of which is difficultly reducible, is thoroughly distributed in a set hydraulic cement.

5. A process for the production of hydrogen from a vaporized hydrocarbon having a higher molecular weight than methane which comprises bringing said hydrocarbon into interaction with a gas capable of converting carbon into carbon monoxide, at a temperature between 400° and 1000° C. and in the presence of a catalyst consisting of a composition in which a material comprising nickel present in at least one of the forms of metal, oxide, hydroxide and carbonate, together with a difficultly reducible oxide of a metal selected from groups 2 to 6 of the periodic system is thoroughly distributed in a set hydraulic alumina cement.

6. The process according to claim 1 in which the metal of the iron group selected is nickel.

7. Process according to claim 1 in which the gas capable of converting carbon into carbon monoxide is steam.

RUDOLF HUETTNER.
GUSTAV WIETZEL.